United States Patent [19]

Pond, Sr.

[11] Patent Number: 4,881,681

[45] Date of Patent: Nov. 21, 1989

[54] PROCESS FOR MODIFYING THE SURFACE OF METAL OR METAL ALLOY SUBSTRATES AND SURFACE MODIFIED PRODUCTS PRODUCED THEREBY

[76] Inventor: Robert B. Pond, Sr., 299 Ridge Rd., Westminster, Md. 21157

[21] Appl. No.: 243,608

[22] Filed: Sep. 13, 1988

[51] Int. Cl.$^4$ .............................................. B23K 23/00
[52] U.S. Cl. .................................... 228/198; 228/205; 228/241; 228/248; 228/118; 427/229; 75/27
[58] Field of Search ............... 228/118, 198, 199, 205, 228/241, 248; 75/27; 427/226, 229; 164/53, 54; 419/45

[56] References Cited

U.S. PATENT DOCUMENTS

| | | | |
|---|---|---|---|
| 2,807,082 | 9/1957 | Zambrow et al. | 419/45 |
| 3,206,846 | 9/1965 | Slayter et al. | 228/198 |
| 3,415,697 | 12/1968 | Bredzs et al. | 228/241 |
| 3,899,306 | 8/1975 | Knopp et al. | 228/241 |

FOREIGN PATENT DOCUMENTS

| | | | |
|---|---|---|---|
| 603904 | 8/1960 | Canada | 75/27 |
| 1467737 | 10/1969 | Fed. Rep. of Germany | 75/27 |
| 27625 | of 1897 | United Kingdom | 75/27 |
| 568786 | 4/1945 | United Kingdom | 419/45 |

OTHER PUBLICATIONS

Hausner, H. H., Activated Sinterwelding, p. 172, MPR, Mar. 1984.

*Primary Examiner*—Nicholas P. Godici
*Assistant Examiner*—Samuel M. Heinrich
*Attorney, Agent, or Firm*—Oliff & Berridge

[57] ABSTRACT

A tightly bonded abrasion resistant surface layer is formed on, or a binding layer is formed therebetween, reactive metal or metal alloy substrates. A powdered mixture of oxides, at least one of the oxides having a heat of oxidation lower than the heat of oxidation of the oxide of the substrate, is disposed on the substrate. The substrate with the oxide powder disposed thereon is heated to a temperature lower than the melting point or solidus temperature of the substrate. The powdered mixture of oxides preferably comprises fly ash. An abrasion resistant surface layer may be bonded to a structural part by mixing the powdered mixture of oxides with powdered reactive metal or reactive metal alloy, disposing the resultant mixture on the part, and heating.

2 Claims, No Drawings

PROCESS FOR MODIFYING THE SURFACE OF METAL OR METAL ALLOY SUBSTRATES AND SURFACE MODIFIED PRODUCTS PRODUCED THEREBY

BACKGROUND OF THE INVENTION

The present invention relates to a process for modifying the surface characteristics of reactive metal and metal alloy substrates and to the surface-modified metal or metal alloy substrates produced thereby.

Reactive metals commonly used in engineering applications, such as aluminum, magnesium and titanium, are soft to scratch but serviceable in their elemental state. Most of the alloys of such reactive metals are similarly serviceable despite being soft to scratch. However, the scope of the potential usefulness of these metals and alloys would be greatly expanded if the surfaces of the metals and alloys could be rendered scratch or abrasion resistant.

The present inventor has discovered a method whereby the surfaces of reactive metals or alloys can be modified so that the surface properties of the metal or alloy are beneficially changed. In accordance with the present invention, this modification requires the use of a material such as fly ash, which is produced by the combustion of fossil fuels, or a mixture of powdered oxides similar to those contained in fly ash.

The basic chemical reactions which occur during the process of the present invention are known and occur in a process known as the "Thermit process". The Thermit process is generally practiced to allow field repair of iron or steel sections, such as railroad tracks. In the Thermit process, aluminum powders are mixed with iron oxide powders and ignited. The process is autogeneous and is terminated when the iron oxide is completely reduced by the aluminum. The aluminum is oxidized and the heat of oxidation is so high that the iron produced is in a superheated molten condition. The ratio of iron oxide to aluminum must be controlled so that an excessive amount of aluminum is not available to alloy with the iron.

It has now been discovered that it is possible to cause the chemical reaction between aluminum and fly ash or other oxides having a heat of oxidation lower than that of aluminum oxide, at temperatures below the melting point of aluminum. The inventive process provides a means for generating a tightly bonded abrasion resistant layer on a metal or metal alloy substrate by preparing the surface of a metal or metal alloy substrate, packing it in fly ash or a mixture of iron oxide and other components, and then heating it to temperatures just below the melting point of the metal or alloy, thereby producing a tightly bonded surface layer on the metal or alloy substrate. Since the surface layer is tightly bonded to the substrate, it is also possible to build up a layered structure by providing a plurality of metal or alloy substrates, packing fly ash or a mixture of oxides including iron oxide between the substrates, and then heating the layered structure to just below the melting point of the metal or alloy. The resulting structure comprises alternate layers of a very soft ductile material and a very hard brittle material. The resultant product is macroscopically reminiscent of the steel microconstituent pearlite or of the macrostructure of Damascus steel.

It has further been discovered that a hard grinding material can be made without employing the high temperatures required to make alundum or synthetic corundum from bauxite. In accordance with a known process, artifical corundum or emery is manufactured by causing iron oxide and aluminum oxide to fuse together. This operation is carried out by heating the mineral bauxite at very high temperatures, above 2,000° F., and results in an industrially useful grinding material known as alundum. According to one aspect of the present invention, a hard grinding material can be made by combining fly ash, or a similar mixture of oxides and powdered aluminum and then heating the mixture at a temperature well below 2,000° F. The hard grinding material of this invention can be bonded in situ during the production thereof to a structural tool part or can be shaped into a suitable configuration for later use as an insert for a machining operation.

SUMMARY OF THE INVENTION

The present invention relates to a process for modifying the surface of metal or metal alloy substrates, and to surface modified substrates produced thereby. A tightly bonded, abrasion resistant surface layer is formed on a metal or metal alloy substrate by disposing on the substrate a powdered mixture of oxides, at least one of the oxides having a heat of oxidation lower than the heat of oxidation of the oxide of the substrate, and then heating the substrate with the oxide powder disposed thereon to a temperature lower than the melting point or solidus temperature of the metal or metal alloy substrate.

According to a first aspect of the present invention, the tightly bonded abrasion resistant surface layer is provided on at least one outer surface of a metal or metal alloy substrate. In accordance with a second aspect of the invention, a plurality of metal or metal alloy substrates may be joined together, for example in a layered or mesh structure, by disposing a powdered mixture of oxides between adjacent metal or metal alloy substrates and then heating the substrates and powdered mixture to tightly bond the adjacent substrates together with a strong, hard layer therebetween. According to yet a third aspect of the present invention, a powdered metal such as aluminum can be added to a powdered oxide mixture in order to produce a hard grinding material or to provide a hard grinding surface on a metal or metal alloy substrate.

Therefore, it is an object of the present invention to produce a metal or metal alloy substrate having a tightly bonded abrasion resistant surface layer.

Another object of the present invention is to provide a process for modifying the surface of a metal or metal alloy substrate using an inexpensive powdered oxide mixture, particularly fly ash.

A still further object of the present invention is to provide a process for bonding a plurality of metal or metal alloy substrates together using an inexpensive powdered oxide mixture, particularly fly ash.

Yet another object of the present invention is to provide a hard grinding material produced from an inexpensive powdered oxide mixture, such as fly ash, and a metal powder.

Yet a further object of the present invention is to provide a process for forming a hard grinding surface on a metal or metal alloy structural part.

Still another object of the present invention is to provide a process for using a readily available, low-cost earth product, such as fly ash, which is generally disposed of and used as landfill or the like.

Additional objects and advantages of the present invention will be apparent to those skilled in the art by reference to the following detailed description and examples.

DETAILED DESCRIPTION OF PREFERRED EMBODIMENTS OF THE INVENTION

According to a first aspect of the present invention, there is provided a process for modifying the surface characteristics of a reactive metal or metal alloy substrate. In this process, a tightly bonded abrasion resistant surface layer is provided on at least one outer surface of the metal or metal alloy substrate. A powder comprising a mixture of oxides is disposed on the outer surface of the metal or metal alloy substrate and then the substrate with the powder disposed thereon is heated to produce a tightly bonded abrasion resistant surface layer on the substrate. Preferably, the powder comprising a mixture of oxides is fly ash.

The substrate may comprise a reactive metal or a metal alloy. Among the reactive metals useful as the substrate in the present invention are, for example: aluminum, magnesium, titanium, zirconium, molybdenum and chromium. Of these reactive metals, aluminum is especially preferred. The metal alloys useful as the substrate include, for example: aluminum alloys such as ASTM 1100, 2024 and 7075, magnesium alloys such as Dowmetal, ASTM FS-1 and Dowmetal J-1, and titanium alloys such as Ti6.4 (Ti, GA1, 4V). The metal or alloy substrate may have any desirable shape, such as a wire, a bar, a plate and the like. The present invention is not limited by the shape of the metal or alloy substrate and the intended use of the surface modified substrate will typically determine the shape thereof.

The powder disposed on the metal or alloy substrate comprises at least one oxide powder. The oxide in the powder must have a heat of oxidation lower than the heat of oxidation of the reactive metal or a reactive metal in the metal alloy of the substrate. Preferably, the powder comprises iron oxide and at least one other oxide or powdered metal. A powder comprising iron oxide and silicon oxide has been found to be particularly useful. Most preferably, the powder comprises fly ash, the principal constituents of which are aluminum oxide, silicon oxide and iron oxide. The particle size of the powder disposed on the metal or alloy substrate is generally selected in accordance with the desired thickness of the abrasion resistant surface layer to be provided on the substrate. Average particle sizes ranging from about 1 to about 275 microns may be used.

According to the invention, after the powder is disposed on the surface of the metal or alloy substrate, the substrate having the powder thereon is heated to produce the tightly bonded abrasion resistant surface layer. The temperature to which the structure is heated is determined by the components of the metal or alloy substrate. Preferably, the powder and the substrate are heated to a temperature just below the melting point or solidus temperature of the reactive metal or metal alloy of the substrate. In order to ensure adequate bonding of the surface layer to the substrate, the heating temperature should be within about 25° F. below the melting point or solidus temperature. The heating is maintained until a desired or maximum hardness is achieved.

In some instances, it may be convenient or desirable to accelerate the reaction which produces the surface modification or bonding. This can be accomplished, in the case of reactive metal alloys, by raising the heating temperature to a temperature which is just above the solidus temperature of the alloy so that a minor amount of the substrate will be liquid and yet the substrate will maintain its original shape. Similarly, in the case of a reactive metal substrate, the heating temperature may be raised to just above the melting point of the reactive metal.

In order to ensure the completion of the reactions of this inventive process, it is necessary to develop an intimate contact between the oxide powder or fly ash and the reactive metal or alloy of the substrate. Typically, the reactive metal or alloy substrate will have a tenacious oxide film on the surface thereof which tends to thwart intimate contact between the reactive metal or alloy and the powder disposed thereon. Thus, the surface of the substrate to which the abrasion resistant layer is to be bonded should be treated to remove the oxide film. The oxide film can be removed by known processes such as ball milling, wire brushing, sanding and the like. Intimate contact between the powder and the reactive metal or alloy of the substrate can be accomplished by ball milling the substrate together with the powder whereby the abrasive action causes the powder particles to break through the oxide film on the substrate and become embedded in the metal or alloy substrate. Similarly, intimate contact can be accomplished by plastically deforming the substrate, thereby breaking the oxide film, while the powder is being forced into the newly exposed surface. This type of intimate contact can be accomplished, for example, during a rolling or drawing operation.

To ensure that the abrasion resistant surface layer is tightly bonded to the substrate, it is desirable to subject the powder and substrate to a pressing operation after heating, while the substrate and powder are hot. Generally, such a pressing operation will be conducted at a pressure of from 5,000 to 50,000 psi, preferably 10,000 to 30,000 psi, more preferably 15,000 to 20,000 psi, for a time sufficient to ensure sufficient bonding strength.

According to a second aspect of the present invention, there is provided a process for producing a structure comprising a plurality of tightly bonded metal or alloy substrates. This aspect of the present invention differs from the first aspect in that at least two metal or alloy substrates are provided and the oxide powder is disposed between adjacent surfaces of the two substrates. The substrates may be arranged in any desirable configuration. For example, the substrates may be stacked in a layered structure wherein the oxide powder is disposed between two adjacent metal or alloy substrates. Alternatively, the substrates may be in the form of wires and the resultant structure may be a wire mesh wherein the oxide powder is disposed on the wires at least such that it is between the wires at the intersecting points thereof. The substrate and powder compositions, the heating conditions, the surface treatment and the optional pressing conditions are the same as set forth above.

In accordance with the third aspect of the present invention, there is provided a process for producing a hard, grinding material as a self sustaining body or as a surface layer on a metal or metal alloy substrate. According to this process, the oxide powder comprises a metal or metal alloy powder in addition to an oxide powder. Preferably, the powder comprises fly ash and a reactive metal or metal alloy powder. Among the reactive metal and metal alloy powders useful in this process are the same materials described above with respect to the reactive metal or reactive metal alloy substrate. The average fly ash particle sizes are preferably about 1 to about 275 microns, and the metal or metal alloy particles are preferably selected to have a particle size similar to that of the fly ash. The fly ash is preferably present in an amount of 2 to 30% by weight of the powder, more preferably about 5 to 20%, most preferably about 15%.

In this process, the powder, comprising an oxide powder and a reactive metal or metal alloy powder, is heated to a temperature of from 1,250° to 2,000° F. for a period of time of from 10 to 60 minutes to produce a hard grinding material. Alternatively, the powder comprising an oxide powder and a reactive metal powder may be disposed on a structural part and then heated to a temperature of from 1,250 to 2,000° F. to produce a hard grinding surface layer on the structural part. This process is particularly useful in producing a hard grinding surface on a metal or alloy tool, such as on a steel file.

The following examples are intended to illustrate the present invention, and are not to be construed as limiting the scope of the claimed invention.

EXAMPLE I

Two one inch cubes of annealed 2024 aluminum alloy were ball milled with fly ash for one hour. The ball milled aluminum alloy cubes were then stacked one atop the other and heated to 1000° F. for 1 hour. The stacked structure was then pressed at 15,000 psi while hot to ensure intimate contact of the fly ash and elemental aluminum, and then removed from the press. A hard layer, 12 microns thick, was produced on all of the free surfaces of the aluminum alloy cubes and the two cubes were bonded together.

EXAMPLE II

Five annealed plates of aluminum, each plate being 1/16 of an inch thick and 1 inch square, were sanded to remove the oxide layer from the surfaces thereof. The plates were stacked for furnace heating with different conditions between each pair of plates. The first two plates were stacked directly on one another with no additive provided therebetween. A small amount of aluminum powder blended with 5% by weight fly ash was provided between the second and third plates. A 10% by weight fly ash and aluminum powder was provided on the surfaces between the third and fourth aluminum plates. A powder comprising 20% by weight fly ash and aluminum powder was disposed on the surfaces between the fourth and fifth plates. In each instance, the quantity of the blended powder was minimized. The stacked structure was heated to 1000° F., pressed while hot at 15,000 psi, and then removed from the press. The first and second plates, which had no powder disposed therebetween, did not bond. The remaining plates were bonded together and a microscopic examination showed that a thin, hard layer was produced between each of the remaining plates of the stacked structure.

EXAMPLE III

Aluminum alloy nails and small bars of aluminum were ball milled in fly ash, packed in fly ash in a refractory container, heated to 1000° F. for one hour and then removed. Each of the resultant products had a thin, less than 10 micron, hard surface layer thereon.

EXAMPLE IV

A one inch magnesium bar was ball milled in fly ash, placed in an inert atmosphere, heated to 1000° F., allowed to cool to room temperature, and then removed from the inert atmosphere. The resultant structure contained a hard surface layer approximately 10 microns thick.

Although the present invention has been described in detail with reference to specific embodiments thereof, it is to be understood that modifications can be made without departing from the spirit and scope of the present invention as described above and as claimed below.

What is claimed is:

1. A process for joining a plurality of reactive metal or reactive metal alloy substrates together, said process comprising:
    disposing a powdered mixture comprising fly ash produced by combustion of fossil fuels between adjacent reactive metal or reactive metal alloy substrates; and
    heating the substrates and powdered mixture at a temperature lower than a melting point or solidus temperature of said substrates, thereby producing a bonded structure having a hard bonding layer between said adjacent substrates.

2. A bonded structure produced by the process of claim 1.

* * * * *